United States Patent Office 2,769,646
Patented Nov. 6, 1956

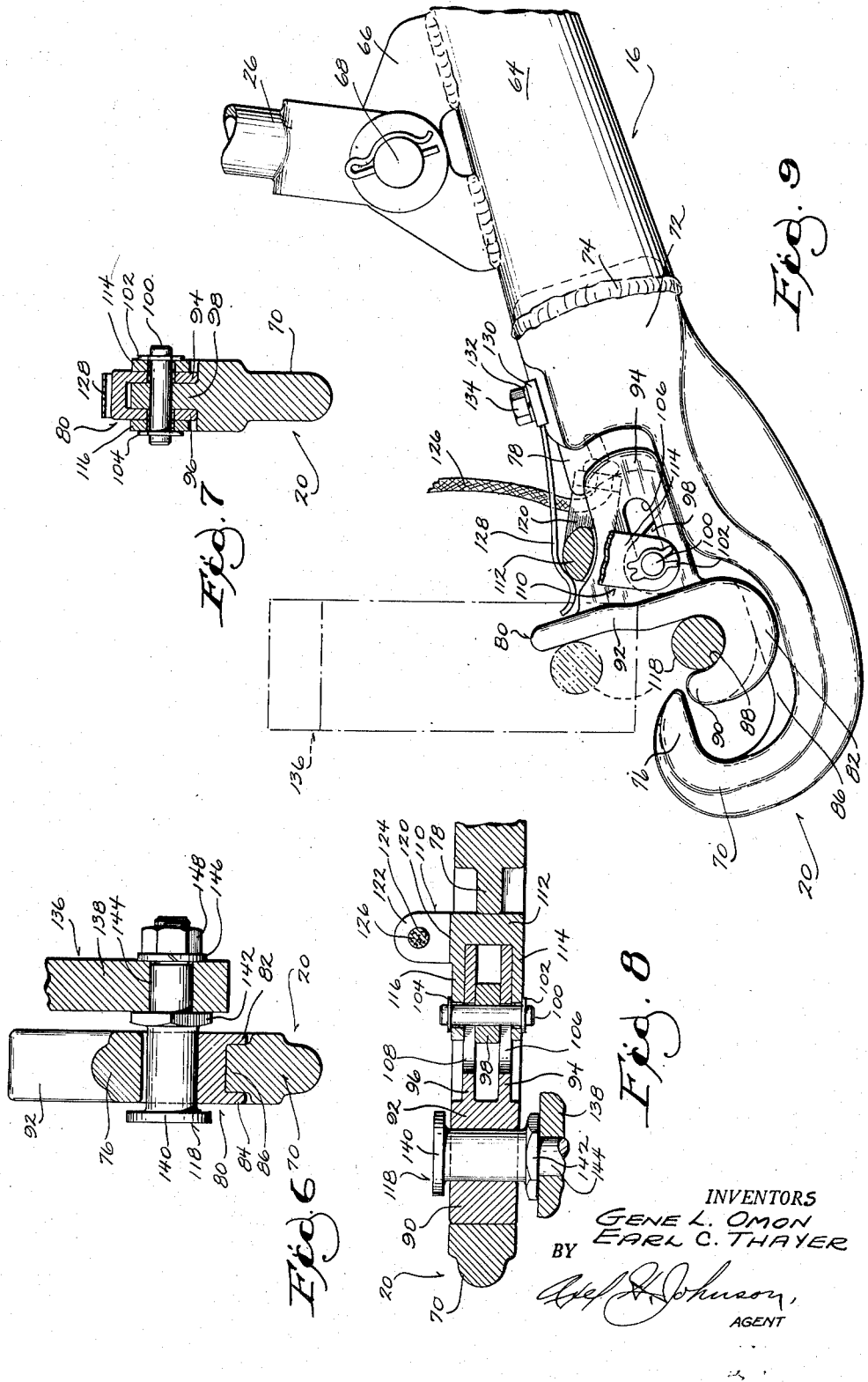

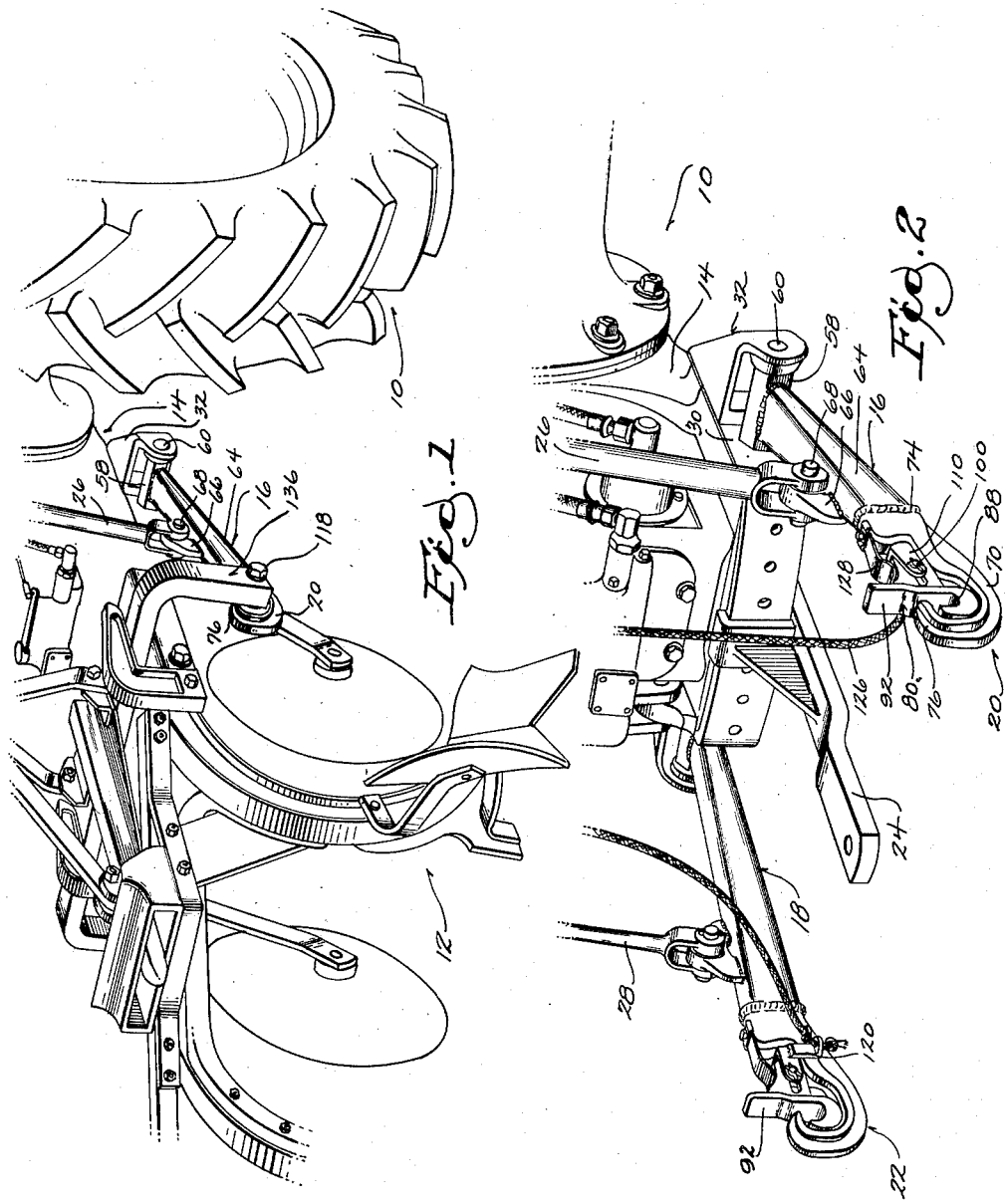

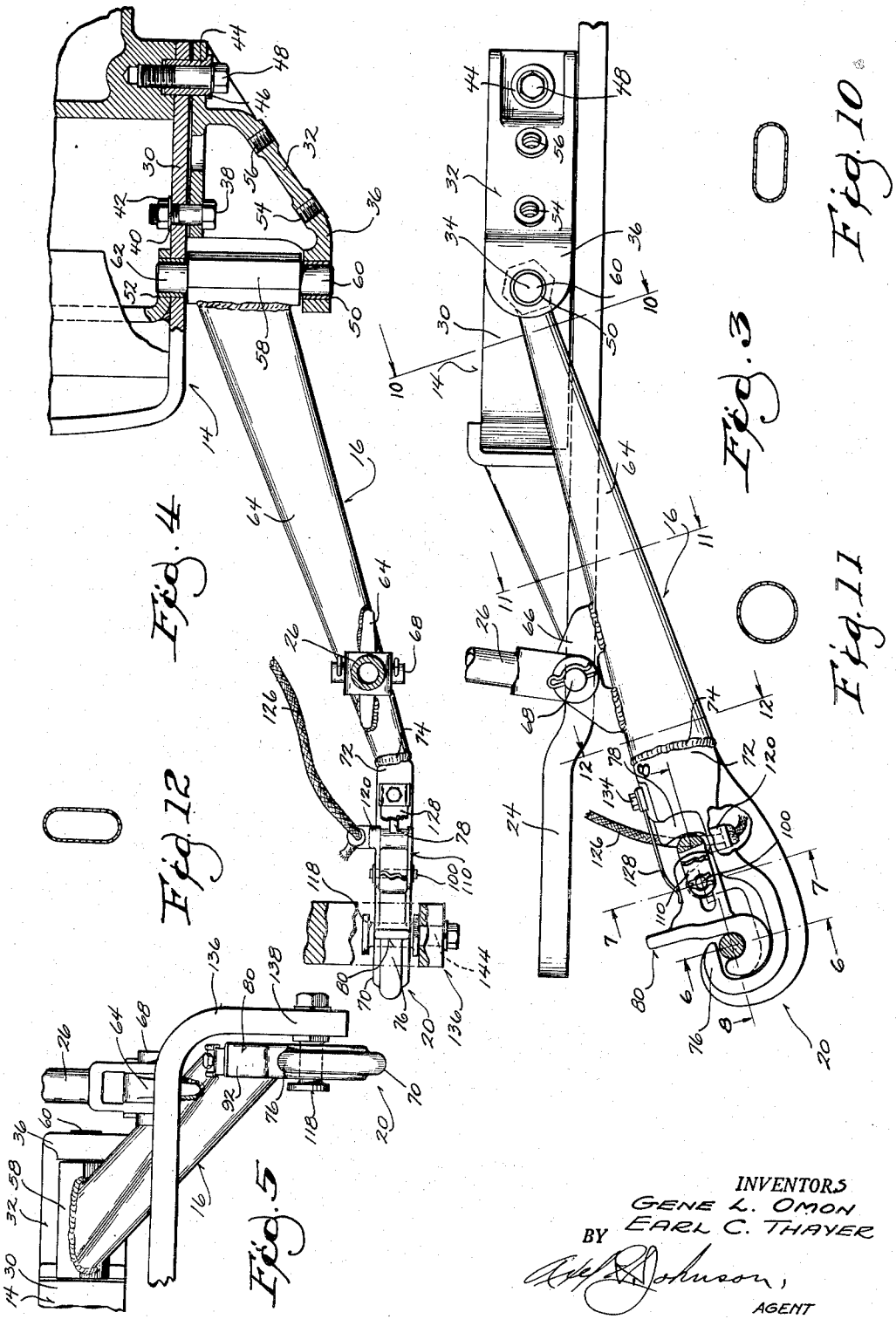

2,769,646

TRACTOR IMPLEMENT HITCH HAVING A POSITIVE LOCKING LATCH

Gene L. Omon, Milwaukee, and Earl C. Thayer, Racine, Wis., assignors to J. I. Case Company, Racine, Wis., a corporation of Wisconsin Application January 26, 1953, Serial No. 333,068

3 Claims. (Cl. 280—504)

This invention pertains to implement hitches for tractors having rearwardly extending draft arms and hydraulic means for adjusting the height of the arms. This invention pertains specifically to the provision of hitches which will enable a tractor operator to back into an implement and hitch the tractor and implement together and begin operation without alighting from the tractor seat. This device also permits the operator to disengage the implement without stepping down from the tractor.

Devices of this nature must be reliable so that an implement hitched thereto will not become disengaged accidentally. Such hitch devices should also be capable of convenient release with little effort on the part of the operator, while he maintains his position on the tractor seat.

One object of this invention is to provide an implement hitch for tractors having rearwardly extending draft arms pivotally mounted thereon.

Another object is to provide implement hitch jaws which permit easy release of the implement from the tractor seat.

Another object is to provide hitch jaws which permit the tractor operator to hitch an implement to the tractor while remaining in the tractor seat.

Another object of this invention is to provide a positive locking latch for implement hitches which will prevent inadvertent disengagement of the implement.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings:

Fig. 1 shows a fragmentary view of a tractor provided with the invention and hitched to an implement.

Fig. 2 shows a fragmentary rear view of a tractor provided with the invention and with the implement disconnected.

Fig. 3 shows an elevational side view of a draft arm and the means for connecting it to a tractor.

Fig. 4 is a plan view of the draft arm of Fig. 3.

Fig. 5 is a fragmentary rear view of the invention looking forward toward the tractor.

Fig. 6 is a section at 6—6 of Fig. 3, showing a fragment of the implement yoke.

Fig. 7 is a section at 7—7 of Fig. 3.

Fig. 8 is a section at 8—8 of Fig. 3, indicating the position of the latch when it is locked against release.

Fig. 9 is an elevational side view of the hitch jaw showing the latch member in the opened position to allow release of the implement, and Figs. 10, 11, and 12 are sections taken, respectively, at 10—10, 11—11, and 12—12 of Fig. 3.

The terms "fore" and "aft" as used in the description of this invention, are to be understood to be in directions substantially parallel to the direction of travel of the tractor. The terms "forwardly," "backwardly" and "rearwardly," are to be likewise construed.

Referring to Fig. 1, 10 is a fragmentary angular rear view of a tractor provided with the invention and having a plow 12 hitched thereto. Tractor 10 is provided with a frame 14 of a conventional type and which will be referred to only when necessary in order to clearly explain the invention. A pair of draft arms 16 and 18 are pivoted to tractor 10 as shown in Figs. 1, 2, 3, and 4, and 5, and which arms terminate in draft hooks 20 and 22. A drawbar 24 forms part of the tractor equipment but is swung to one side when operating implements with the present invention.

Figs. 2, 3, and 4 illustrate the method of connecting the draft arms to the tractor. Arms 16 and 18 are provided with lifting links 26 and 28 which are pivoted as shown on arms 16 and 18. Links 26 and 28 extend upwardly and are connected to a lifting rock shaft not shown. The purpose of the lifting rock shaft is to permit raising and lowering arms 16 and 18 when hitching or unhitching an implement, which rock shaft does not concern this invention, and will not be further described.

Figs. 1, 2, 3, and 4 show the means employed to pivot arms 16 and 18 to the tractor frame 14. Only arm 16 and its related elements will be described as arms 16 and and 18 are identical except that they are allochirally related. Frame 14 has a vertical surface 30 to which a pivot bracket 32 is secured. Bracket 32 is of cast material or fabricated, and has a surface which conforms to the surface 30 of frame 14. Arm 16 pivots about a transverse axis 34 perpendicular to the surface 30. Bracket 32 has a portion 36 spaced from surface 30 and which portion comprises one support for the pivot of arm 16. A bolt 38 passes through bracket 32 and frame 14, and a lock washer 40 and nut 42 on bolt 38 provide one of the means of fastening the bracket to frame 14. A tubular dowel 44 provides a rigid support for bracket 32 relative to the surface 30, and prevents any shifting of the bracket from effecting free pivoting of the arm 16. Dowel 44 is made with a shoulder 46 which is adapted to contact bracket 32, and a cap screw 48 passes through the hole in dowel 44 and is threaded into frame 14.

Portion 36 has provided therein a bushing 50 of hardened steel, or other suitable bearing material which is forced in place in a hole provided therefor.

Frame 14 has a bushing 52 which is similar to bushing 50. Bushing 52 is co-axial with bushing 50 and is forced into a suitable hole in frame 14.

A pair of threaded holes 54 and 56 is provided in bracket 32 so as to permit the subsequent mounting of an implement not shown.

A pivot shaft 58 of polygonal shape in this instance, is provided with trunnions 60 and 62 which are adapted to rotate in bushings 50 and 52. Arm 16 extends rearwardly from pivot shaft 58 as shown in Figs. 1, 2, 3, and 4. Arm 16 comprises a tubular member 64 which is originally of a cylindrical shape and which is partially flattened at the end adjacent the pivot shaft 58 so as to conform longitudinally to the latter. Shaft 58 and tubular member 64 are secured together as an integral unit by welding in this instance, as indicated in Figs. 3 and 4. A bracket 66 is welded or otherwise secured to member 64 and serves as an anchor for link 26. A pin 68 provides a pivot for link 26. The other end of member 64 is flattened in a manner similar to that in contact with shaft 58 but with the long dimension of the flattened portion positioned vertically, in order to accommodate the draft hook 20.

Draft hook 20 comprises a hook member 70, which, in this instance, is forged or cast and of a design shown in Figs. 3 and 4. A butt end 72 is provided which conforms to the opening in tubular member 64. End 72 is inserted into the opening and welded or otherwise suitably fastened as at 74. Member 70 is directed parallel to the line of travel of the tractor. Hook member 70 is ribbed for strength and is provided with an upwardly and forwardly directed hook portion 76. An abutment web 78 is formed integrally with the forward portion of hook member 70. The function of abutment web 78 will appear as the invention is described.

A slidable latch member 80 is slidable in a fore-and-aft direction, being guided by flanges 82 and 84, and an engaging rib 86 on hook member 70. A saddle 88 is provided in member 80 as shown in Figs. 3 and 9 and provided with an upturned portion 90. A second upturned portion 92 completes the saddle, the function of which will be later described.

Extending forwardly from portion 92 is a pair of webs 94 and 96 which are spaced apart a suitable distance to allow a lug 98 which is integral with hook member 70 to pass freely between the webs 94 and 96 in order to allow latch member 80 to slide freely relative to the hook member 70. Abutment web 78 is of a thickness to permit entrance to the space between webs 94 and 96 so that the latter are permitted to take the position shown in Fig. 9. Lug 98 has provided therein a transverse pin 100 which extends a suitable distance on both sides of lug 98 and is provided with annular grooves to accommodate retaining rings 102 and 104.

Elongated slots 106 and 108 are provided in webs 94 and 96 through which pin 100 passes and which are of a length sufficient to allow suitable travel of latch member 80. The primary purpose in providing slots 106 and 108 is to guide, and to prevent displacement of latch member 80 from hook member 70 by cooperation with pin 100.

A latch lock 110 is pivoted on pin 100 and comprises a transverse body portion 112 and arms 114 and 116 integral therewith. Holes are provided in the ends of arms 114 and 116 to accommodate pin 100. Pin 100 is forced into the hole in web 98 after latch member 80 and latch lock 110 have been positioned. As a precaution to prevent displacement of pin 100, retaining rings 102 and 104 are assembled in the grooves provided on pin 100.

A reference to Figs. 3, 4, 7, 8, and 9 will make clear the relative positions of the sliding latch member 80 and the latch lock 110 when the implement is hitched for operation as shown in Fig. 1.

Referring to Figs. 3, 4, 6, and 8, saddle 88 shows a hitch trunnion 118 resting therein which is common to all implements embracing this invention. Two trunnions 118 are necessary, one for each arm 16 and 18. These will be described later. In the normal operating position as indicated in Figs. 3 and 8, body portion 112 of latch lock 110 is positioned intermediate the ends 94 and 96 of sliding latch member 80, and abutment web 78. The holes in arms 114 and 116 which accommodate pin 100 are sufficiently large so that continuous metal-to-metal contact between ends 94 and 96, transverse member 112, and abutment web 78 is assured. Thus, when a force such as that provided by an implement tends to move the latch member 80 forwardly, and out of hook 70, interception of transverse body 112 prevents displacement owing to contact between the ends of arms 94 and 96, portion 112 and abutment 78. Thereby trunnion 118 is positively confined within hook portion 76.

When it is desired to release an implement from the draft hook 20, it is necessary to rotate latch lock 110 upwardly about pin 100, as shown in Fig. 9. To permit latch lock 110 to be pivoted about pin 100 without compelling the operator to leave the tractor seat, a lug 120 is provided, as an integral part of lock 110. Lug 120 has a lip 122 which has a hole 124 through which a rope 126 is passed and knotted to prevent it from pulling out.

The other end of rope 126 is secured to the tractor seat or at a place convenient to the operator who has merely to pull the rope to rotate the latch lock 110.

In order to release an implement resting on the ground, such as shown hitched to the tractor in Fig. 1, lock 110 should be rotated to the position shown in Fig. 9. A rearward movement of the tractor will then shift latch member 80 out of hook portion 76, owing to the resistance of the implement. Draft arm 16 can then be lowered to the point where trunnion 118 assumes the position shown by the dotted lines of Fig. 9. The tractor can then be driven away from the implement. To hitch the implement from the tractor seat, the operation is reversed.

A spring 128 is secured to the body of hook member 70 by a clip 130 to prevent the spring from turning laterally, and a washer 132 and nut 134 is provided to complete the assembly. The purpose of spring 128 is to consistently urge latch member 80 into a locking position such as shown in Figs. 3 and 4, and to prevent it from being accidentally unlocked.

Referring to Fig. 1 the plow 12 in this instance carries a yoke 136 which forms part of the frame of the plow and is bent downwardly at the ends as more clearly shown in Figs. 5 and 6 and designated as 138. Yoke 136 is of rectangular cross section and rigid enough to withstand the forces imposed upon it.

Trunnion 118 shown in Figs. 6, 8, and 9 is provided with a flange 140 to aid in guiding the draft hook 20 when the implement is being hitched. A second flange of polygonal shape 142 serves two purposes; to aid in guiding the draft hook and to also provide a means whereby a wrench may be applied when assembling the trunnion in the portion 138. Trunnion 118 has a shank 144 reduced in diameter and provided with a thread, which extends beyond portion 138. A washer 146 and nut 148 completes the assembly.

The function of portion 92 as indicated in Fig. 9 is to aid in guiding the trunnion 118 into the saddle 88. Yoke 136 of the disconnected implement is shown in dotted lines as is trunnion 118. The draft arm 16 is lowered to the position shown in Fig. 9 and the tractor is backed into the trunnion. The hydraulic system is then actuated to raise the draft arm until the trunnion 118 rests in saddle 88. As the tractor is then driven forwardly, the resistance of the implement to forward movement will carry latch member 80 rearwardly into the hook portion 76 and latch lock 110 will then drop between portions 94 and 96, being urged by spring 128 to the locking position, intermediate webs 94 and 96 and abutment web 78, thereby locking member 80 and trunnion 118 against release.

An additional function of portion 92 is to aid in maneuvering the implement into parallel relationship, one such portion being provided on each saddle.

It frequently happens that the implement trunnions are not parallel to the two portions 92 of the hitch when the tractor is in hitching position. In this instance in order to hitch the implement continuous maneuvering of the tractor would be time consuming. In this instance it is merely necessary to adjust the portions 92 of each saddle in a horizontal alignment with the implement trunnions and continue to back the tractor against the trunnions, thus forcing the implement into parallelism with the saddle seats, and therefore into position to be hitched. Hitching is then proceeded with in the manner hereinbefore described.

The above being a complete description of an illustrative embodiment of the invention, what is claimed as new and desired to be secured by Letters Patent of the United States is:

1. In a tractor having a rearwardly extending draft arm terminating in a hitch means, said hitch means comprising a hitch member secured integrally to said arm and terminating in an upwardly and forwardly directed hook and having an abutment spaced forwardly of said hook and provided with a vertical lug intermediate said hook and said abutment, a latch member slidable fore-and-aft intermediate said hook and said abutment from a position within said hook, said latch member provided with a transverse saddle and a pair of forwardly-directed bifurcations adapted to receive said lug therebetween in slidable relation, said bifurcations provided with fore-and-aft extending longitudinal slots, a transverse pin fixed in said lug and cooperating with said slots to limit sliding of said latch member to a fore-and-aft direction, a latch lock having a transverse body portion and spaced arms, said arms positioned to receive said forwardly-directed bifurcations therebetween, said spaced arms pivoted on said transverse pin to allow said transverse body portion to be positioned intermediate said abutment and said forwardly-directed bifurcations to prevent said latch member from being displaced forwardly out of said hook, said latch lock rotatable about said pin to permit said latch member to slide forwardly and out of said hook.

2. In a tractor having a rearwardly extending draft arm terminating in a hitch means, said hitch means comprising a hitch member secured to said arm and terminating in an upwardly and forwardly directed hook having an abutment spaced forwardly of said hook and provided with a central vertical web intermediate said hook and said abutment, a latch member slidable from a position within said hook to a point adjacent said abutment, said latch member provided with a transverse saddle and a pair of spaced forwardly-directed bifurcations adapted to receive said web therebetwen in slidable relation, said bifurcations provided with fore-and-aft extending longitudinal slots, a transverse pin fixed in said web and cooperating with said slots to limit said latch member to a fore-and-aft displacement, a latch lock having a transverse body portion and spaced walls positioned to receive said forwardly-directed bifurcations therebetween, said spaced walls pivoted on said transverse pin to allow said transverse body portion to be positioned intermediate said abutment and said forwardly-directed bifurcations to prevent said latch member from being displaced forwardly relative to said hook, and means to rotate said latch lock about said pin to permit said latch member to be displaced out of said hook.

3. In a tractor having a rearwardly extending draft arm terminating in a hitch means, said hitch means comprising a hitch member secured to said arm and terminating in an upwardly and forwardly directed hook and having an abutment spaced forwardly of said hook and integral therewith, a latch saddle member slidable fore-and-aft within said hook and to a point adjacent said abutment, said latch member provided with a forwardly directed portion having slots, a transverse pin fixed in said hitch member and cooperating with said slots to limit said latch member to displacement in a fore-and-aft direction, a latch lock having a transverse body portion pivoted on said pin and rotatable to a position intermediate said abutment and said forwardly directed portion to prevent said latch member from being displaced forwardly from said hook, and means to rotate said latch lock about said pin to permit said latch member to slide forwardly and out of said hook.

References Cited in the file of this patent

UNITED STATES PATENTS

| | | |
|---|---|---|
| 1,865,786 | Paul | July 5, 1932 |
| 1,962,804 | Cassidy | June 12, 1934 |
| 1,982,874 | Jamison | Dec. 4, 1934 |
| 2,179,955 | Rawnsley | Nov. 14, 1939 |
| 2,384,185 | McElhinney | Sept. 4, 1945 |
| 2,522,791 | Ketel | Sept. 19, 1950 |